United States Patent
Yamashiro

(10) Patent No.: US 10,933,525 B2
(45) Date of Patent: Mar. 2, 2021

(54) HORIZONTAL ARTICULATED ROBOT

(71) Applicant: FANUC CORPORATION, Yamanashi (JP)

(72) Inventor: Hikaru Yamashiro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/415,227

(22) Filed: May 17, 2019

(65) Prior Publication Data

US 2020/0009720 A1    Jan. 9, 2020

(30) Foreign Application Priority Data

Jul. 4, 2018    (JP) .............................. JP2018-127767

(51) Int. Cl.
*B25J 9/00* (2006.01)
*F16F 15/02* (2006.01)

(52) U.S. Cl.
CPC ............. *B25J 9/0009* (2013.01); *F16F 15/02* (2013.01)

(58) Field of Classification Search
CPC . B25J 9/0009; B25J 9/044; B25J 9/043; B25J 9/101; B25J 9/1005; B25J 9/10; B25J 9/009; B25J 9/0087; F16F 15/02; F16F 1/028; F16F 1/36; F16F 1/3615; F16F 1/373; F16F 1/3732; F16F 1/3735; F16F 1/377; F16D 1/06; F16D 1/076; F16D 1/08; F16D 1/0835; F16D 1/041; F16D 1/023; F16D 1/0805; F16D 71/02

USPC ..... 74/490.01; 403/191, 195, 196, 234, 235, 403/236, 290, 335, 338, 398

See application file for complete search history.

(56) References Cited

U.S. PATENT DOCUMENTS

| | | | | |
|---|---|---|---|---|
| 1,557,958 | A | * | 10/1925 | Anderson ................. F16D 3/72 464/78 |
| 2,711,312 | A | * | 6/1955 | Ratigan ................. F04B 53/145 267/153 |
| 3,042,391 | A | * | 7/1962 | Glaser ....................... F16F 1/02 267/181 |

(Continued)

FOREIGN PATENT DOCUMENTS

| | | | | |
|---|---|---|---|---|
| EP | 2551068 A1 | * | 1/2013 | .......... B25J 19/0025 |
| JP | S61-103792 A | | 5/1986 | |

(Continued)

*Primary Examiner* — Victor L Macarthur
*Assistant Examiner* — T. Scott Fix
(74) *Attorney, Agent, or Firm* — Maier & Maier, PLLC

(57) ABSTRACT

A horizontal articulated robot includes a base, a first arm supported by the base to be pivotable in a horizontal direction, a second arm supported by the first arm to be pivotable in the horizontal direction, a shaft supported by the second arm to be linearly movable along a longitudinal axis in a vertical direction, and a stopper mounted to the shaft and limiting movement of the shaft within a movable range. The stopper includes a fixing section fixed to an outer circumferential surface of the shaft and protruding therefrom, and a shock absorbing section fixed to one of the fixing section and the second arm. The shock absorbing section is disposed in a position sandwiched by the fixing section and the second arm in the vertical direction, and is elastically compressed in the vertical direction when the shaft tries to move beyond the movable range.

3 Claims, 5 Drawing Sheets

(56) References Cited

U.S. PATENT DOCUMENTS

| | | | | |
|---|---|---|---|---|
| 3,150,506 A * | 9/1964 | Alcaro | F16D 3/72 | 464/78 |
| 3,390,546 A * | 7/1968 | Hollis | F16D 3/72 | 464/78 |
| 3,455,013 A * | 7/1969 | Rayburn | F16D 3/72 | 228/160 |
| 3,516,681 A * | 6/1970 | Cox | B23B 31/305 | 279/4.02 |
| 3,709,379 A * | 1/1973 | Kaufeldt | B25J 9/023 | 414/591 |
| 3,844,137 A * | 10/1974 | Zugel | F16D 3/72 | 464/78 |
| 4,068,965 A * | 1/1978 | Lichti | F16D 1/04 | 403/313 |
| 4,354,397 A * | 10/1982 | Fix | E21B 17/07 | 267/141 |
| 4,567,418 A * | 1/1986 | Takemoto | B25J 9/042 | 118/109 |
| 4,610,598 A * | 9/1986 | Hamada | B25J 9/042 | 414/744.5 |
| 4,620,831 A * | 11/1986 | Poncet | B25J 9/044 | 414/744.3 |
| 4,790,700 A * | 12/1988 | Schwartzman | B23B 31/207 | 267/181 |
| 4,797,061 A * | 1/1989 | Munakata | B25J 9/042 | 414/744.5 |
| 4,858,897 A * | 8/1989 | Irifune | F16D 3/72 | 267/181 |
| 4,899,611 A * | 2/1990 | Pinna | B62D 1/20 | 74/492 |
| 4,913,605 A * | 4/1990 | Schwartzman | B23B 31/207 | 409/231 |
| 4,973,221 A * | 11/1990 | Anderson | F01D 25/04 | 188/379 |
| 5,041,060 A * | 8/1991 | Hendershot | F16D 3/005 | 464/86 |
| 5,062,619 A * | 11/1991 | Sato | F16F 1/02 | 267/154 |
| 5,090,833 A * | 2/1992 | Oertle | B62D 1/20 | 403/12 |
| 5,241,870 A * | 9/1993 | Holt | B23Q 1/4828 | 73/866.5 |
| 5,271,292 A * | 12/1993 | Sawada | B25J 9/042 | 318/466 |
| 5,299,980 A * | 4/1994 | Agius | F16D 1/0864 | 464/147 |
| 5,302,044 A * | 4/1994 | Spariat | B64G 1/641 | 102/378 |
| 5,314,288 A * | 5/1994 | Schmidt | B62D 43/045 | 254/323 |
| 5,358,350 A * | 10/1994 | Oertle | B62D 1/20 | 403/12 |
| 5,366,316 A * | 11/1994 | Cymbal | B62D 1/16 | 403/359.2 |
| 5,403,111 A * | 4/1995 | Wey | F16B 21/16 | 403/290 |
| 5,558,393 A * | 9/1996 | Hawkins | F16F 1/328 | 267/148 |
| 5,580,184 A * | 12/1996 | Riccitelli | F16D 1/0864 | 280/779 |
| 5,628,578 A * | 5/1997 | McClanahan | B62D 1/16 | 403/13 |
| 6,068,250 A * | 5/2000 | Hawkins | F16F 1/328 | 267/148 |
| 6,202,961 B1 * | 3/2001 | Wilke | B64G 1/641 | 188/378 |
| 6,203,437 B1 * | 3/2001 | Durie | F16D 3/72 | 403/220 |
| 7,097,564 B2 * | 8/2006 | Berg | F16D 3/725 | 267/181 |
| 7,175,112 B2 * | 2/2007 | Uhlmann | F02M 47/027 | 239/533.12 |
| 7,179,009 B2 * | 2/2007 | Stimpfl | B62D 1/20 | 403/53 |
| 7,488,134 B2 * | 2/2009 | Kinme | B62D 1/16 | 403/12 |
| 7,621,940 B2 * | 11/2009 | Harms | A61B 17/7026 | 606/257 |
| 7,666,101 B2 * | 2/2010 | Kakimoto | F16D 1/0864 | 403/236 |
| 7,950,596 B2 * | 5/2011 | Venkataraghavan | H01L 41/0536 | 239/102.2 |
| 8,262,051 B2 * | 9/2012 | Vo | F16F 1/377 | 248/560 |
| 8,262,309 B2 * | 9/2012 | Dallara | F16D 3/387 | 403/233 |
| 9,086,097 B2 * | 7/2015 | Mielke | F16D 1/0864 | |
| 9,206,857 B2 * | 12/2015 | Englert | F16D 3/74 | |
| 9,581,205 B2 * | 2/2017 | Knoth | F16D 1/0864 | |
| 9,938,830 B2 * | 4/2018 | Harper | F01D 1/02 | |
| 10,000,102 B2 * | 6/2018 | Nolte | F16F 1/37 | |
| 2002/0064421 A1 * | 5/2002 | Beaulieu | F16B 7/042 | 403/337 |
| 2004/0091308 A1 * | 5/2004 | Kinme | F16D 3/387 | 403/235 |
| 2006/0073902 A1 * | 4/2006 | Sekine | B62D 1/16 | 464/134 |
| 2006/0212033 A1 * | 9/2006 | Rothman | A61B 17/705 | 606/328 |
| 2008/0148895 A1 * | 6/2008 | Palau | B25J 19/0029 | 74/490.02 |
| 2012/0279341 A1 * | 11/2012 | Ono | B25J 9/044 | 74/490.01 |
| 2014/0178127 A1 * | 6/2014 | Mottier | F16D 1/033 | 403/373 |
| 2019/0154085 A1 * | 5/2019 | Watanabe | F16D 1/06 | |

FOREIGN PATENT DOCUMENTS

| | | | | |
|---|---|---|---|---|
| JP | H03-35992 A | | 2/1991 | |
| JP | 2000-326278 A | | 11/2000 | |
| JP | 2009257458 A | | 11/2009 | |
| JP | 2009275914 A | * | 11/2009 | ......... F16H 57/0497 |
| JP | 2010216610 A | * | 9/2010 | ......... F16D 1/0864 |
| WO | WO-2014083597 A1 | * | 6/2014 | ......... F16H 25/20 |

\* cited by examiner

HORIZONTAL ARTICULATED ROBOT

CROSS-REFERENCE TO RELATED APPLICATIONS

This application claims the benefit of Japanese Patent Application No. 2018-127767, the content of which is incorporated herein by reference.

FIELD

The present invention relates to a horizontal articulated robot, and particularly relates to a structure of a stopper of the horizontal articulated robot.

BACKGROUND

There has been conventionally known a horizontal articulated robot including a base, a first arm that is supported by the base to be pivotable in a horizontal direction, a second arm that is supported by the first arm to be pivotable in the horizontal direction, and a shaft that is supported by the second arm to be movable in a vertical direction and rotatable around a vertical axis (For example, Japanese Unexamined Patent Application, Publication No. 61-103792).

Further, there is known a structure that limits movement of a shaft within a predetermined range by a stopper that is fixed to an end portion of the shaft, in a robot including the shaft that moves in a longitudinal direction (For example, Japanese Unexamined Patent Application, Publication No. 3-35992, and Japanese Unexamined Patent Application, Publication No. 2000-326278).

SUMMARY

One aspect of the present invention is a horizontal articulated robot including a base, a first arm that is supported by the base to be pivotable in a horizontal direction, a second arm that is supported by the first arm to be pivotable in the horizontal direction, a shaft that is supported by the second arm to be linearly movable along a longitudinal axis in a vertical direction, and a stopper that is mounted to the shaft and limits movement in the vertical direction of the shaft within a movable range, wherein the stopper includes a fixing section that is fixed to an outer circumferential surface of the shaft and protrudes in a radial direction from the outer circumferential surface of the shaft, and a shock absorbing section that is fixed to one of the fixing section and the second arm, and the shock absorbing section is disposed in a position sandwiched by the fixing section and the second arm in the vertical direction and is elastically compressed in the vertical direction when the shaft tries to move beyond the movable range.

DETAILED DESCRIPTION

Hereinafter, a horizontal articulated robot according to one embodiment of the present invention will be described with reference to the drawings.

Figure 1:
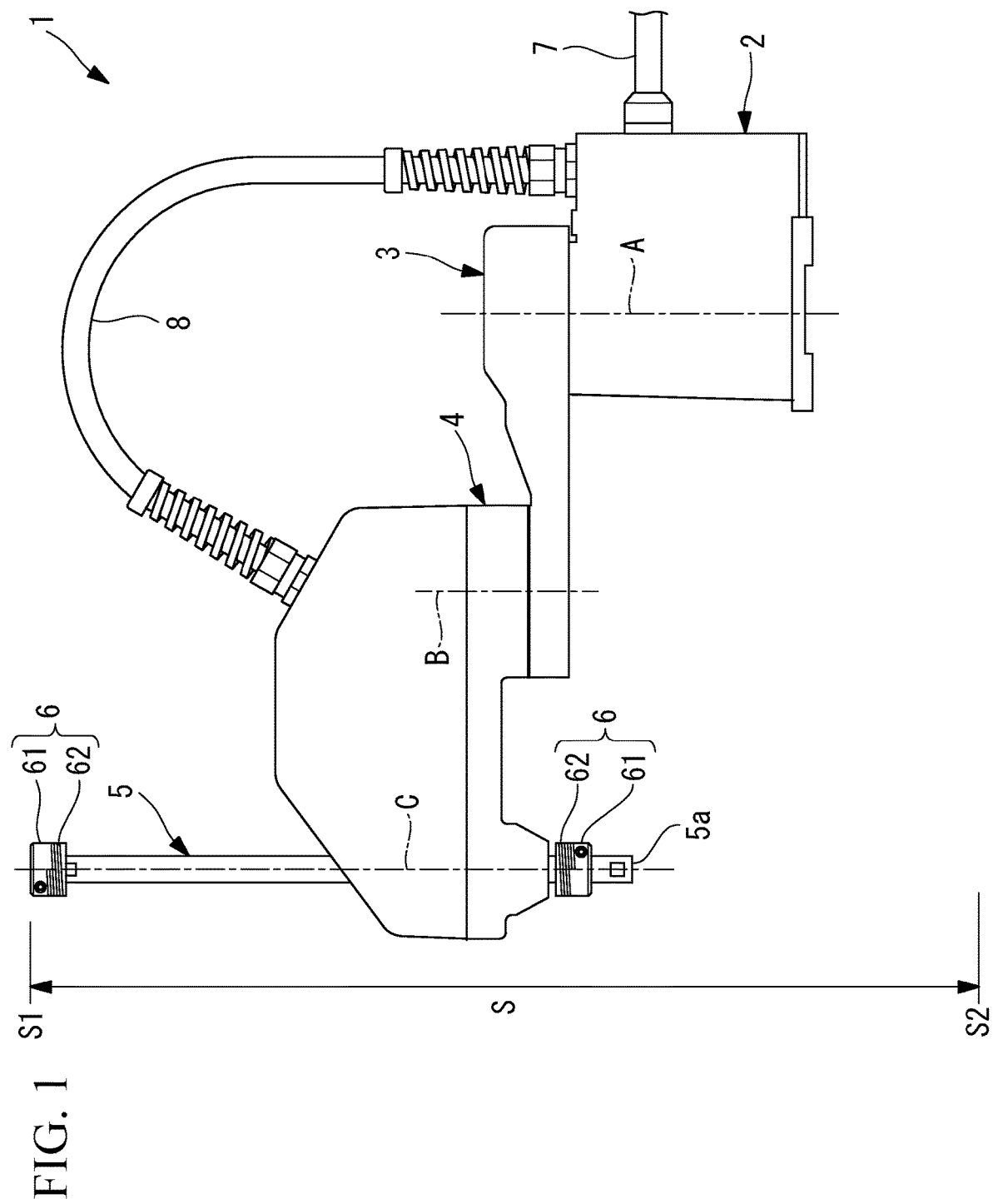
FIG. 1 is an entire configurational view of a horizontal articulated robot according to one embodiment of the present invention.

A horizontal articulated robot 1 according to the present embodiment includes, as illustrated in FIG. 1, a base 2 that is installed on an installation surface, a first arm 3 that is supported by the base 2, a second arm 4 that is supported by the first arm 3, a shaft 5 that is supported by the second arm 4, and two stoppers 6 that are provided at the shaft 5.

Reference sign 7 designates a cable that connects the base 2 and a control device (not illustrated), and reference sign 8 designates a cable that connects the base 2 and the second arm 4. A control signal and power are supplied to a servomotor in the base 2 via the cable 7 from the control device. The control signal and the power are supplied to a servomotor in the second arm 4 via the cables 7 and 8.

One end portion of the first arm 3 is supported by the base 2, and the first arm 3 turns around a first axis A in a vertical direction with respect to the base 2 by a first servomotor (not illustrated).

One end portion of the second arm 4 is supported at the other end portion of the first arm 3, and the second arm 4 turns around a second axis B with respect to the first arm 3 by a second servomotor (not illustrated). The second axis B is parallel to the first axis A.

The shaft 5 penetrates through the other end portion of the second arm 4 in the vertical direction, and is supported by the second arm 4 to be linearly movable along a third axis C, and to be rotatable around the third axis C. The third axis C is parallel to the first axis A and the second axis B, and corresponds to a longitudinal axis of the shaft 5.

Figure 2:
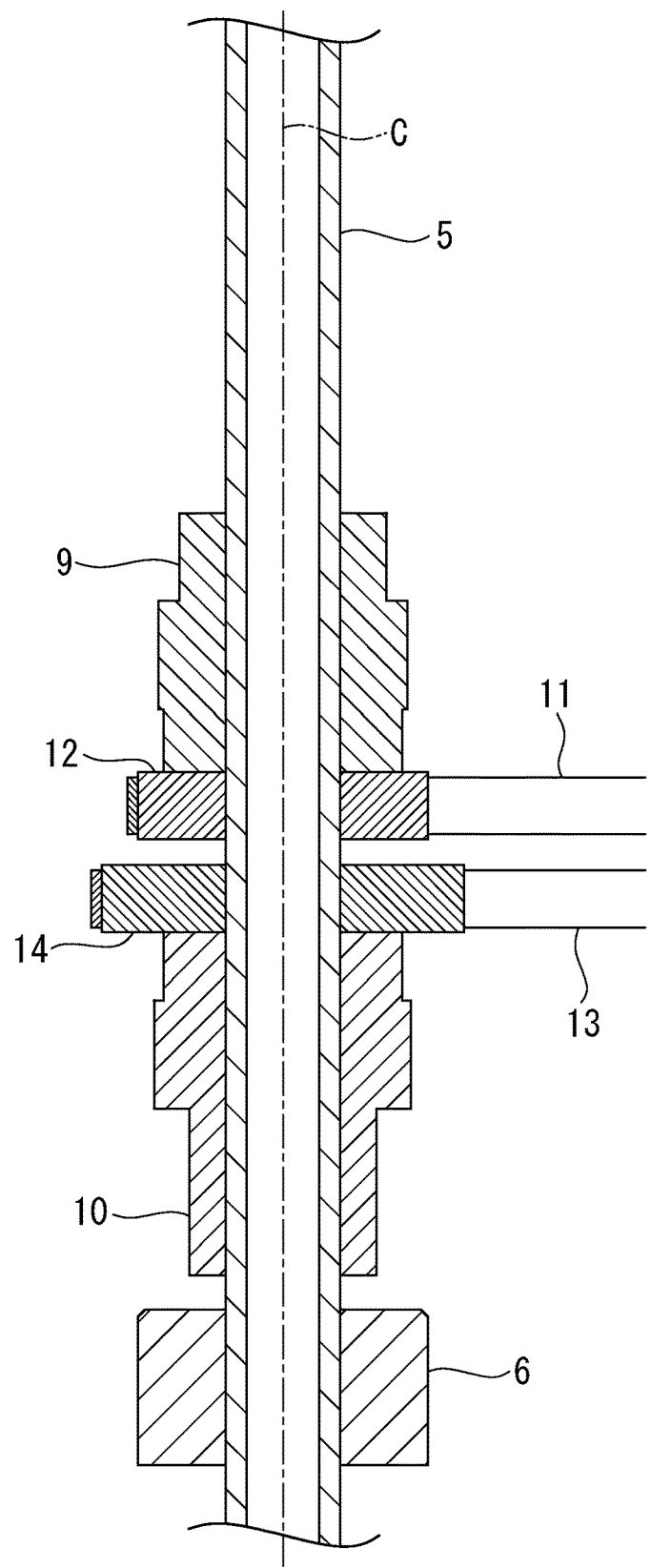
FIG. 2 is a schematic configurational view illustrating a support structure of a shaft inside of a second arm.

Inside of the second arm 4, as illustrated in FIG. 2, a ball screw nut 9 and a ball spline nut 10 that respectively support the shaft 5 are provided. The ball screw nut 9 and the ball spline nut 10 are supported rotatably around the third axis C with respect to the second arm 4 by bearings not illustrated. Rotation of the servomotor (not illustrated) for linear movement is transmitted to the ball screw nut 9 by a belt 11 and a pulley 12, and the ball screw nut 9 is rotated around the third axis C, whereby the shaft 5 moves in the vertical direction along the third axis C. Rotation of the servomotor (not illustrated) for rotation is transmitted to the ball spline nut 10 by a belt 13 and a pulley 14, and the ball spline nut 10 is rotated around the third axis C, whereby the shaft 5 rotates around the third axis C.

Figure 3:
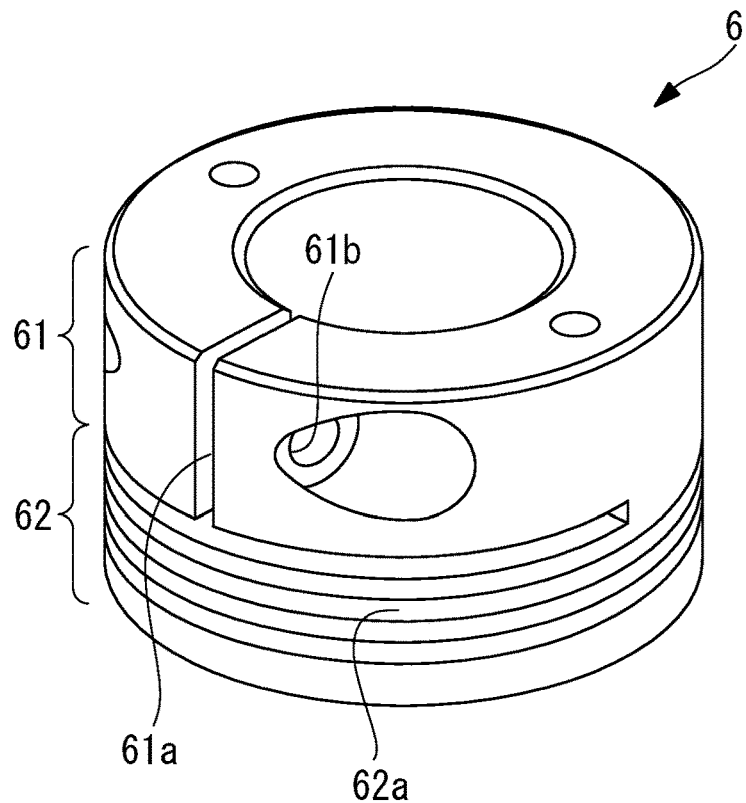
FIG. 3 is a perspective view of a stopper of the horizontal articulated robot in FIG. 1.
Figure 4:
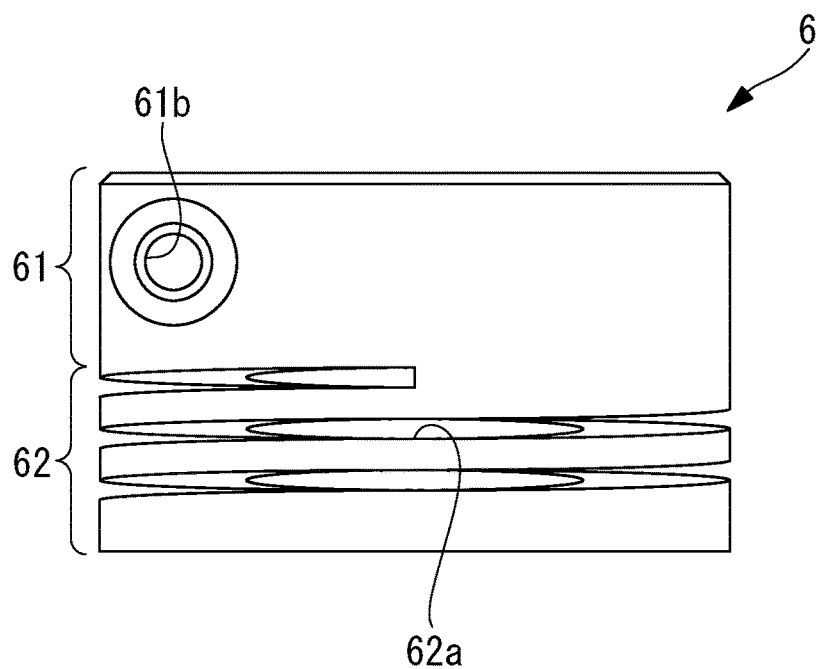
FIG. 4 is a side view of the stopper in FIG. 3.

As illustrated in FIG. 3 and FIG. 4, the stopper 6 is a single member in a cylindrical shape, and has a larger inner diameter than an outer diameter of the shaft 5. The stopper 6 is mounted on an outer circumferential surface of the shaft 5, and protrudes outward in a radial direction from the outer circumferential surface of the shaft 5. The stopper 6 is produced by cutting a cylindrical metal member having high rigidity, for example. The stopper 6 has a fixing section 61 that is fixed to the shaft 5, and a shock absorbing section 62 that is elastically compressible in a direction along a center axis.

The fixing section 61 is one end portion of the stopper 6, and has a slit (axial slit) 61a formed therein. The slit 61a is formed in a direction along the center axis from one end surface of the stopper 6, and penetrates the fixing section 61 in the radial direction from an outer circumferential surface to an inner circumferential surface of the fixing section 61.

In the fixing section 61, a bolt hole 61b orthogonal to the slit 61a is formed. By fastening a bolt into the bolt hole 61b in a state where the fixing section 61 is disposed around the shaft 5, it is possible to reduce the inner diameter of the fixing section 61 and fix the fixing section 61 to the shaft 5 by friction between the inner circumferential surface of the fixing section 61 and the outer circumferential surface of the shaft 5.

The shock absorbing section 62 is the other end portion of the stopper 6, and has a slit (circumferential slit) 62a is formed therein. The slit 62a extends in a circumferential direction of the shock absorbing section 62, and penetrates the shock absorbing section 62 in the radial direction from an outer circumferential surface to an inner circumferential surface of the shock absorbing section 62. The slit 62a is in a spiral shape, for example. The shock absorbing section 62 is elastically compressible in a direction along the center axis of the stopper 6 by reduction in a width of the slit 62a. When the fixing section 61 is fixed to the shaft 5 by the bolt, the inner diameter of the fixing section 61 reduces as described above, but the inner diameter of the shock absorbing section is kept without being reduced. Accordingly, in a state where the fixing section 61 is fixed to the shaft 5, the shock absorbing section 62 is extensible and contractible in a direction along the third axis C.

In the present embodiment, the axial slit 61a is connected to the circumferential slit 62a. Thereby, it is possible to reliably exhibit the above described operation of selectively reducing only the inner diameter of the fixing section 61 in the radial direction, out of the fixing section 61 and the shock absorbing section 62.

One of the stoppers 6 is fixed to an upper end portion of the shaft 5 in an orientation in which the fixing section 61 is disposed at an upper side and the shock absorbing section 62 is disposed at a lower side. The other stopper 6 is fixed to a lower end portion of the shaft 5 in an orientation in which the fixing section 61 is disposed at a lower side and the shock absorbing section 62 is disposed at an upper side. Accordingly, the respective shock absorbing sections 62 are disposed in positions sandwiched in the vertical direction by the fixing sections 61 and the second arm 4. Reference sign 5a designates a wrist portion to which an end effector such as a hand is connected.

In this way, by the two stoppers 6 which are provided at the upper side and the lower side of the second arm 4, a movable range in the vertical direction of the shaft 5 to the second arm 4 is mechanically limited. Specifically, the stopper 6 at the upper side is butted to a top surface of the second arm 4, and thereby further lowering of the shaft 5 is limited. The stopper 6 at the lower side is butted to an undersurface of the second arm 4, and thereby further rising of the shaft 5 is limited.

The control device supplies control signals and power to the respective servomotors in accordance with an operation program, and controls movements of the first arm 3, the second arm 4 and the shaft 5. To the operation program, a stroke range S in the vertical direction of the shaft 5 is set as illustrated in FIG. 1. The control device controls movement in the vertical direction of the shaft 5 in the stroke range S.

The respective stoppers 6 are fixed to the shaft 5 in positions that contact the second arm 4 when the shaft 5 exceeds limits S1 and S2 of the stroke range S. Accordingly, as long as the shaft 5 moves within the stroke range S, the stopper 6 is disposed in a position separated in the vertical direction from a cover of the second arm 4.

Next, an operation of the horizontal articulated robot 1 configured in this way will be described.

According to the horizontal articulated robot 1 according to the present embodiment, a position of a wrist portion 5a of the shaft 5 two-dimensionally changes in the horizontal direction by turning of the first arm 3 around the first axis A, and turning of the second arm 4 around the second axis B. Further, the position of the wrist portion 5a changes in the vertical up-and-down direction by linear movement of the shaft 5 along the third axis C, and a posture of the wrist portion 5a changes around the third axis C by rotation of the shaft 5 around the third axis C.

Here, movement in the vertical direction of the shaft 5 is controlled by the control device within the stroke range S which is set to the operation program. As long as the shaft 5 moves within the stroke range S, the stopper 6 does not interfere with the second arm 4.

However, when limit of the moving range of the shaft 5 by the control device does not normally function due to error setting or the like of the stroke range S of the operation program, the shaft 5 may move beyond the normal stroke range S. At this time, movement of the shaft 5 is mechanically limited by the stoppers 6.

Figure 5:
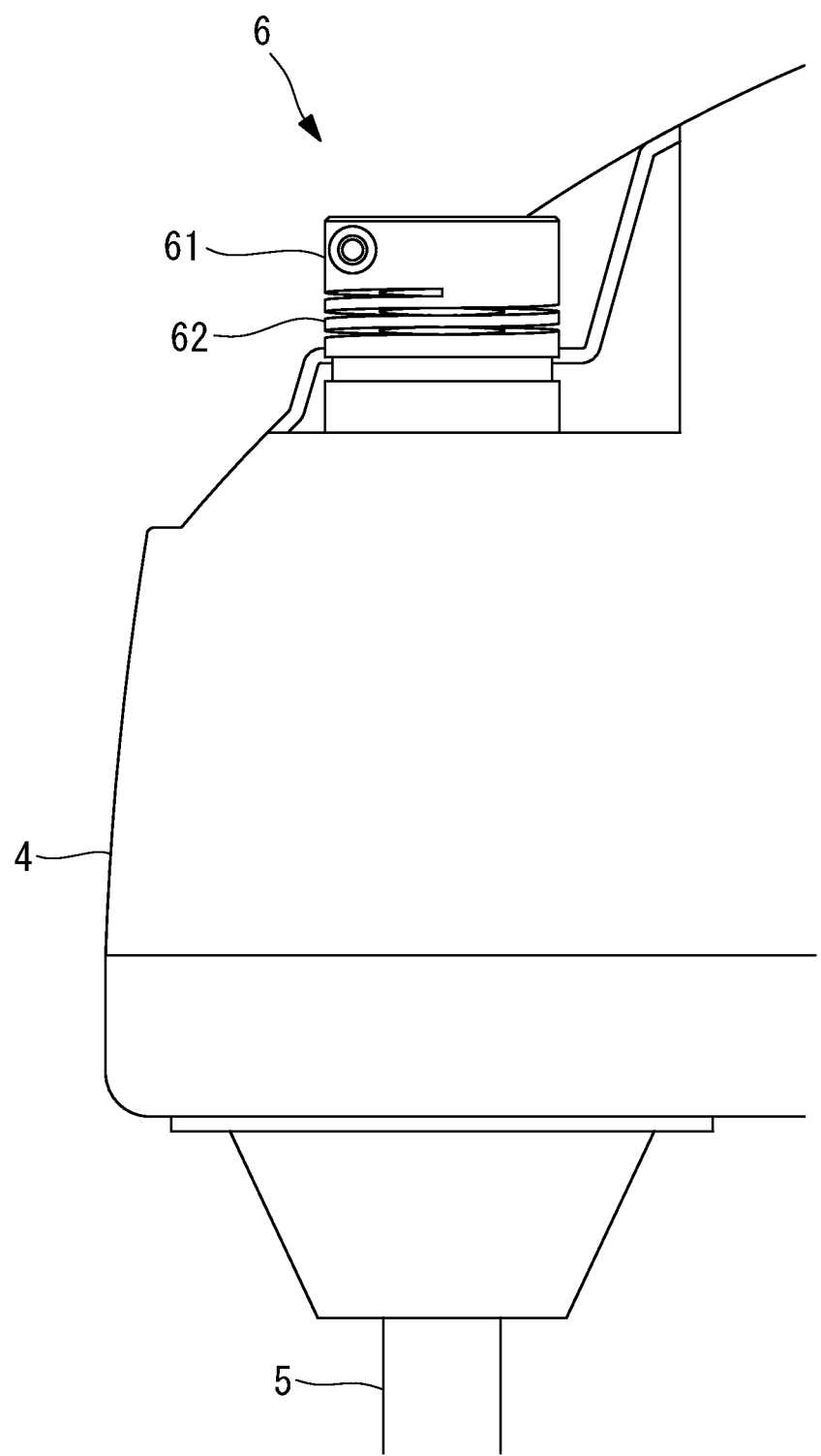
FIG. 5 is a view illustrating a state where a stopper at an upper side is butted to the second arm.

Specifically, when the shaft 5 tries to lower beyond the lower end S2 of the stroke range S, the stopper 6 at the upper side is butted to the top surface of the second arm 4, and thereby further lowering of the shaft 5 is inhibited, as illustrated in FIG. 5. When the shaft 5 tries to rise beyond the upper end S1 of the stroke range S, the stopper 6 at the lower side is butted to the undersurface of the second arm 4, whereby further rising of the shaft 5 is inhibited.

The stopper 6 is fixed to the shaft 5 by friction between the fixing section 61 and the shaft 5, so that when a strong impact is applied to the stopper 6, a position of the stopper 6 may shift, or the stopper 6 may remove from the shaft 5. Further, when a strong impact is applied to the second arm 4, the components of the second arm 4 may be broken. For example, when the stoppers 6 are directly butted to the nuts 9 and 10, impressiones are formed on the nuts 9 and 10 or rolling surfaces of the balls of the shaft 5, and the nuts 9 and 10 do not operate normally.

According to the present embodiment, when the stopper 6 is butted to the second arm 4, the shock absorbing section 62 sandwiched between the fixing section 61 and the second arm 4 is elastically compressed in the vertical direction, whereby an impact is absorbed by the shock absorbing section 62, and an impact which is applied to the fixing section 61 and the second arm 4 is cushioned. Thereby, the stopper 6 can be prevented from removing from the shaft 5, the components of the second arm 4 can be prevented from being broken, and reliability of the horizontal articulated robot 1 can be enhanced.

Further, the shock absorbing section 62 is integrated with the fixing section 61, so that an exclusive structure for mounting the shock absorbing section 62 on the shaft 5 is not required, and increase in the mounting space and weight of the stopper 6 by providing the shock absorbing section 62 in the stopper 6 can be minimized. The mounting space and the weight of the stopper 6 influence operation performance of the shaft 5. According to the present embodiment, the influence on the operation performance of the shaft 5 can be minimized.

When the shock absorbing section 62 is a separated body from the fixing section 61, a complicated structure for causing the shaft 5 to support the shock absorbing section 62 is required. Accordingly, a number of components and the weight of the stopper 6 increase, and operation performance of the shaft 5 can be reduced.

Further, the shock absorbing section 62 is formed from a material with high rigidity and is given elasticity by formation of the slit 62a. The shock absorbing section 62 like this deforms only when a large force in the vertical direction is applied to the shock absorbing section 62. In other words, the shock absorbing section 62 does not deform needlessly while the shaft 5 is moving, especially while the shaft 5 is moving in the horizontal direction.

In the present embodiment, the fixing section 61 is fixed to the shaft 5 by fastening of the bolt, but the fixing section 61 may be fixed to the shaft 5 by another means. For example, the fixing section 61 may be fixed to the shaft 5 by welding. When the fixing section 61 is fixed to the shaft 5 by a means other than bolt fastening, the fixing section 61 may be a member having a shape other than the cylindrical shape.

In the present embodiment, the stoppers 6 are provided at both the upper side and the lower side of the second arm 4, but the stoppers 6 may be provided at only one of the upper side and the lower side of the second arm 4.

In the present embodiment, the fixing section 61 and the shock absorbing section 62 are formed of a single member, but instead of this, the fixing section 61 and the shock absorbing section 62 that are formed of separate members may be fixed alternately.

According to the configuration, different materials can be selected for the fixing section 61 and the shock absorbing section 62.

Figure 6:
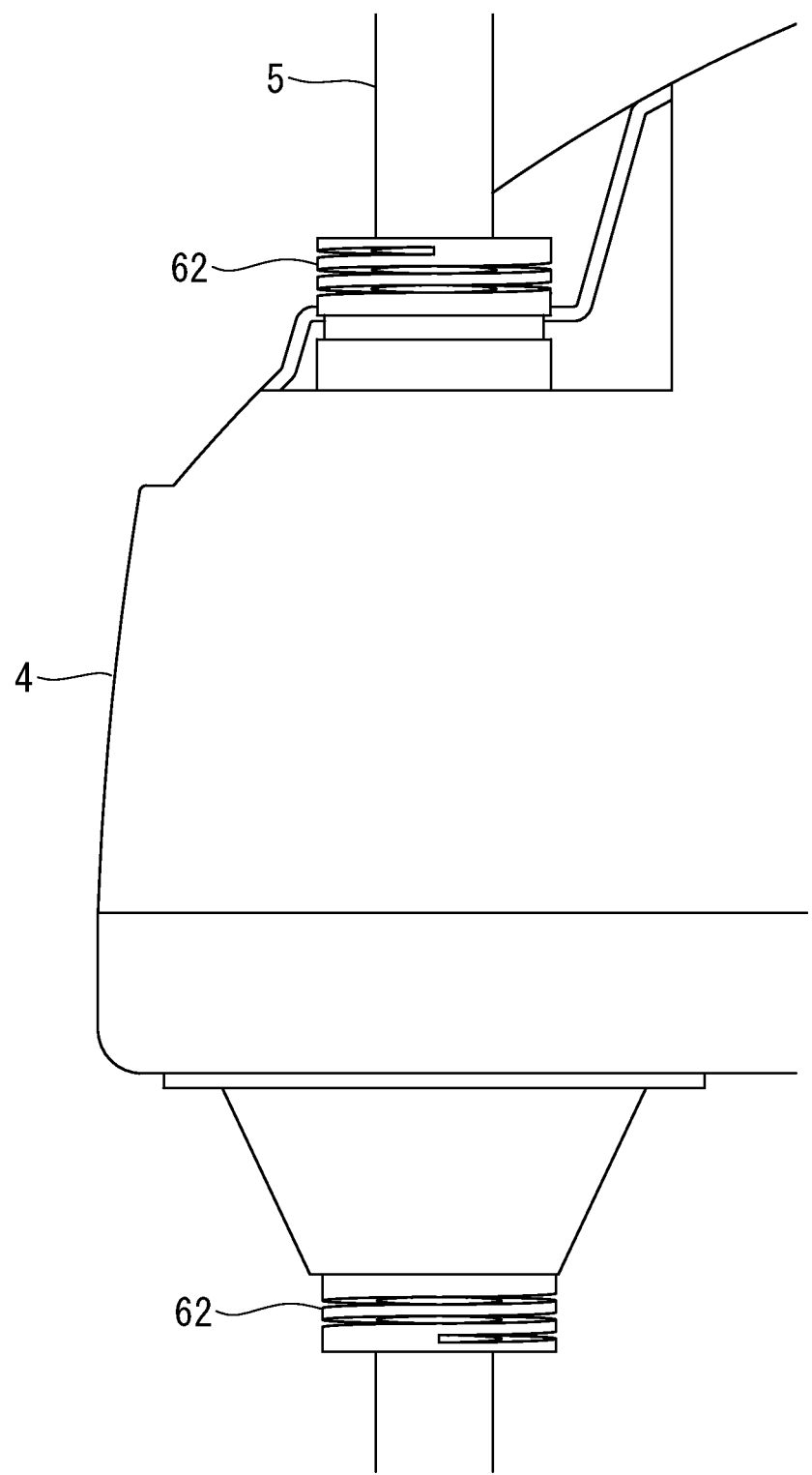
FIG. 6 is a view illustrating a modified example of disposition of a shock absorbing section of the stopper.

In the present embodiment, the shock absorbing section 62 and the fixing section 61 are integrated, but instead of this, the shock absorbing section 62 may be a separate body from the fixing section 61. In this case, as illustrated in FIG. 6, the shock absorbing section 62 of the stopper 6 at the upper side is fixed to the top surface of the second arm 4, and the shock absorbing section 62 of the stopper 6 at the lower side may be fixed to the undersurface of the second arm 4.

In the present embodiment, the shock absorbing section 62 is a cylindrical member in which a continuous spiral slit 62a is formed, but instead of this, the shock absorbing section 62 may be another member that is elastically compressible in the direction along the third axis C.

For example, in the shock absorbing section 62, a plurality of circumferential slits extending in the circumferential direction may be formed. Alternatively, the shock absorbing section 62 may be a spiral spring or an elastic member of a rubber or the like.

In the present embodiment, the stopper 6 at the upper side and the stopper 6 at the lower side are the same, but instead of this, the stopper 6 at the upper side and the stopper 6 at the lower side may be different.

At a time of collision of the stopper 6 at the upper side and the second arm 4, the gravity of the shaft 5 is also applied to the stopper 6, so that the impact which is applied to the stopper 6 at the upper side is larger than an impact that is applied to the stopper 6 at the lower side. Accordingly, the shock absorbing section 62 at the upper side may be larger than the shock absorbing section 62 of the stopper 6 at the lower side so that the stopper 6 at the upper side has higher shock absorbing performance than the stopper 6 at the lower side, for example.

From the above-described embodiment, the following invention is derived.

One aspect of the present invention is a horizontal articulated robot including a base, a first arm that is supported by the base to be pivotable in a horizontal direction, a second arm that is supported by the first arm to be pivotable in the horizontal direction, a shaft that is supported by the second arm to be linearly movable along a longitudinal axis in a vertical direction, and a stopper that is mounted to the shaft and limits movement in the vertical direction of the shaft within a movable range, wherein the stopper includes a fixing section that is fixed to an outer circumferential surface of the shaft and protrudes in a radial direction from the outer circumferential surface of the shaft, and a shock absorbing section that is fixed to one of the fixing section and the second arm, and the shock absorbing section is disposed in a position sandwiched by the fixing section and the second arm in the vertical direction and is elastically compressed in the vertical direction when the shaft tries to move beyond the movable range.

According to the present aspect, a wrist portion at the lower end of the shaft two-dimensionally moves in the horizontal direction by rotation of the first arm and the second arm. The wrist portion moves in the vertical direction by the linear movement of the shaft.

In this case, when the shaft tries to move in the vertical direction beyond the movable range, the fixing section of the stopper which is fixed to the shaft is butted to the second arm via the shock absorbing section, whereby further movement of the shaft is limited. At this time, the shock absorbing section sandwiched between the fixing section and the second arm is elastically compressed, whereby the impact which is applied to the fixing section and the second arm is cushioned. Accordingly, breakage of the stopper and the second arm due to collision of the stopper can be prevented, and reliability can be enhanced.

In the above described aspect, the shock absorbing section may be integrated with the fixing section.

According to the configuration, the shock absorbing section is also mounted to the shaft by fixation of the fixing section to the shaft. Accordingly, a structure for mounting the shock absorbing section to the shaft or the second arm is not required, and the number of components and the weight of the stopper can be decreased.

In the above described aspect, the stopper is a cylindrical single member that covers the outer circumferential surface of the shaft, the fixing section may be one end portion of the member in the vertical direction, and the shock absorbing section may be the other end portion of the member in the vertical direction.

According to the configuration, the stopper can be produced by machining of the single member.

In the above described aspect, a circumferential slit that extends in a circumferential direction may be formed in the shock absorbing section.

According to the configuration, the shock absorbing section which is elastically compressible can be produced by simple machining, which is advantageous especially when the stopper is formed from a material with high rigidity.

In the above described aspect, an axial slit that extends in the vertical direction may be formed in the fixing section.

According to the configuration, by reduction of a width of the axial slit, an inner diameter of the fixing section is reduced while an inner diameter of the shock absorbing section is kept. Accordingly, the fixing section can be fixed to the shaft by friction, by reduction in the inner diameter of the fixing section. Further, out of the fixing section and the shock absorbing section, only the fixing section can be selectively fixed to the shaft.

REFERENCE SIGNS LIST

1 Horizontal articulated robot
2 Base

3 First arm
4 Second arm
5 Shaft
6 Stopper
7 Fixing section
61a Slit (axial slit)
61b Bolt hole
62 Shock absorbing section
62a Slit (circumferential slit)
9 Ball screw nut
10 Ball spline nut
11, 13 Belt
12, 14 Pulley
A, B, C Axis

The invention claimed is:

1. A horizontal articulated robot, comprising:
a base;
a first arm that is supported by the base to be pivotable in a horizontal direction;
a second arm that is supported by the first arm to be pivotable in the horizontal direction;
a shaft that is supported by the second arm to be linearly movable along a longitudinal axis in a vertical direction; and
a stopper that is mounted to the shaft and limits movement in the vertical direction of the shaft within a movable range,
wherein the stopper comprises:
a fixing section that is fixed to an outer circumferential surface of the shaft and protrudes in a radial direction from the outer circumferential surface of the shaft, wherein
the fixing section includes an axial slit that extends in the vertical direction and a bolt hole formed orthogonal to the axial slit, and the fixing section is fixed around the shaft by fastening a bolt into the bolt hole; and
a shock absorbing section that is fixed to one of the fixing section and the second arm and formed as part of the stopper, wherein
the shock absorbing section includes a continuous spiral slit and is disposed in a position sandwiched by the fixing section and the second arm in the vertical direction and is elastically compressed in the vertical direction when the shaft tries to move beyond the movable range.

2. The horizontal articulated robot according to claim 1, wherein the shock absorbing section is integrated with the fixing section.

3. The horizontal articulated robot according to claim 2, wherein the stopper is a cylindrical single member that covers the outer circumferential surface of the shaft, the fixing section is one end portion of the member in the vertical direction, and the shock absorbing section is another end portion of the member in the vertical direction.

* * * * *